United States Patent
Stobbe

(10) Patent No.: US 8,763,915 B2
(45) Date of Patent: Jul. 1, 2014

(54) IDENTIFICATION PLATE WITH ADJUSTABLE DAMPING

(75) Inventor: Anatoli Stobbe, Barsinghausen (DE)

(73) Assignee: EYES OPEN Corporation, Carson City, NV (US)

( * ) Notice: Subject to any disclaimer, the term of this patent is extended or adjusted under 35 U.S.C. 154(b) by 100 days.

(21) Appl. No.: 13/363,677

(22) Filed: Feb. 1, 2012

(65) Prior Publication Data

US 2013/0026237 A1    Jan. 31, 2013

(30) Foreign Application Priority Data

Feb. 1, 2011    (DE) .................... 20 2011 002 173 U

(51) Int. Cl.
| | |
|---|---|
| *G06K 19/00* | (2006.01) |
| *G06K 19/06* | (2006.01) |
| *G06K 5/00* | (2006.01) |
| *G08B 13/14* | (2006.01) |
| *G05B 19/00* | (2006.01) |
| *G05B 23/00* | (2006.01) |
| *G06F 7/00* | (2006.01) |
| *G06F 7/04* | (2006.01) |
| *H04Q 9/00* | (2006.01) |
| *H04B 3/00* | (2006.01) |
| *G08B 29/00* | (2006.01) |

(52) U.S. Cl.
USPC ........... 235/492; 235/380; 235/487; 235/493; 340/572.7; 340/572.1; 340/5.6; 340/5.62

(58) Field of Classification Search
USPC ............... 235/487, 492, 493, 380; 340/572.7, 340/572.6, 5.6, 5.62
See application file for complete search history.

(56) References Cited

U.S. PATENT DOCUMENTS

| | | | |
|---|---|---|---|
| 6,121,544 A * | 9/2000 | Petsinger .................... 174/353 |
| 6,127,938 A * | 10/2000 | Friedman ................. 340/693.6 |
| 6,147,591 A | 11/2000 | Stobbe |
| 6,208,235 B1 * | 3/2001 | Trontelj ...................... 340/10.1 |
| 6,343,744 B1 * | 2/2002 | Shibata et al. ................ 235/492 |
| 6,378,774 B1 * | 4/2002 | Emori et al. ................. 235/492 |
| 6,830,193 B2 * | 12/2004 | Tanaka .......................... 235/492 |
| 7,070,101 B2 | 7/2006 | Deguchi et al. |
| 7,106,196 B2 | 9/2006 | Adams et al. |
| 7,253,734 B2 | 8/2007 | Moskowitz |

(Continued)

FOREIGN PATENT DOCUMENTS

| | | |
|---|---|---|
| EP | 1939793 | 1/2012 |
| WO | WO2006021525 | 3/2006 |

OTHER PUBLICATIONS

Search Report issued by the European Patent Office on Jun. 8, 2012 for applicant's corresponding European patent application No. EP 12000301.7-2411.

*Primary Examiner* — Daniel Walsh
(74) *Attorney, Agent, or Firm* — Jeffrey L. Thompson; Thompson & Thompson, P.A.

(57) ABSTRACT

An identification plate having a chip module that includes a chip, a coupling element connected to the chip, and an antenna module comprising an antenna lead. The coupling element is coupled to the antenna lead by a coupling field that creates a contactless coupling. An adjustable damping element is arranged in the proximity of the coupling element. The damping element projects into the coupling field and dampens the coupling field. In this manner, a maximum value of a transmitting and receiving range of the identification plate can be reduced.

18 Claims, 4 Drawing Sheets

(56) References Cited

U.S. PATENT DOCUMENTS

| | | | | |
|---|---|---|---|---|
| 7,460,015 B2* | 12/2008 | Forster et al. | | 340/572.3 |
| 7,460,018 B2* | 12/2008 | Kubo | | 340/572.7 |
| 7,731,094 B2* | 6/2010 | Phillips | | 235/492 |
| 7,791,453 B2 | 9/2010 | Chen et al. | | |
| 7,808,384 B2* | 10/2010 | Stobbe et al. | | 340/572.1 |
| 7,817,045 B2 | 10/2010 | Onderko | | |
| 8,193,911 B2* | 6/2012 | Eren et al. | | 340/10.1 |
| 8,228,199 B2* | 7/2012 | Noakes et al. | | 340/572.3 |
| 8,322,624 B2* | 12/2012 | Finn | | 235/492 |
| 8,416,061 B2* | 4/2013 | Eren et al. | | 340/10.1 |
| 8,474,726 B2* | 7/2013 | Finn | | 235/492 |
| 8,490,880 B2* | 7/2013 | Tanner et al. | | 235/492 |
| 2001/0030238 A1* | 10/2001 | Arisawa | | 235/492 |
| 2001/0032250 A1* | 10/2001 | Kusakabe et al. | | 709/217 |
| 2003/0080853 A1* | 5/2003 | Tuttle et al. | | 340/10.1 |
| 2004/0085190 A1* | 5/2004 | Tuttle et al. | | 340/10.1 |
| 2004/0140896 A1* | 7/2004 | Ohkawa et al. | | 340/572.1 |
| 2005/0012616 A1* | 1/2005 | Forster et al. | | 340/572.7 |
| 2006/0043198 A1* | 3/2006 | Forster | | 235/492 |
| 2006/0044769 A1* | 3/2006 | Forster et al. | | 361/760 |
| 2007/0069037 A1* | 3/2007 | Kawai | | 235/492 |
| 2008/0018477 A1* | 1/2008 | Forster et al. | | 340/572.7 |
| 2008/0211675 A1* | 9/2008 | Forster et al. | | 340/572.7 |
| 2008/0252460 A1* | 10/2008 | Stobbe | | 340/572.3 |
| 2008/0314982 A1* | 12/2008 | Stobbe et al. | | 235/439 |
| 2009/0152362 A1* | 6/2009 | Ayala et al. | | 235/492 |
| 2009/0224058 A1* | 9/2009 | Savry | | 235/492 |
| 2009/0272815 A1* | 11/2009 | Tanner et al. | | 235/492 |
| 2009/0309703 A1* | 12/2009 | Forster | | 340/10.1 |
| 2010/0194542 A1* | 8/2010 | Noakes et al. | | 340/10.1 |
| 2010/0214176 A1 | 8/2010 | Fixter et al. | | |
| 2010/0273469 A1* | 10/2010 | Seban et al. | | 455/418 |
| 2010/0302038 A1* | 12/2010 | Brommer et al. | | 340/572.1 |
| 2011/0122015 A1 | 5/2011 | Muehlmann | | |
| 2012/0001730 A1* | 1/2012 | Potyrailo et al. | | 340/10.1 |
| 2012/0018522 A1* | 1/2012 | Le Garrec et al. | | 235/492 |
| 2012/0038445 A1* | 2/2012 | Finn | | 336/105 |
| 2012/0280044 A1* | 11/2012 | Mullis et al. | | 235/492 |
| 2013/0181056 A1* | 7/2013 | Itay et al. | | 235/492 |

* cited by examiner

IDENTIFICATION PLATE WITH ADJUSTABLE DAMPING

BACKGROUND OF THE INVENTION

1. Field of the Invention

The present invention relates generally to identification plates for transmitting and receiving data using electromagnetic waves, and in particular, to an identification plate with a damping element for limiting a reading range of the identification plate.

2. Description of the Related Art

An identification plate is characterized by a data carrier having an electronic chip which can be read remotely by a reading device, and optionally written as well. The energy required for the operation of the chip is received wirelessly from the reading device. Both data and energy are transmitted via an electromagnetic field.

Identification plates for the purpose of identifying a person are commonly the size of a credit card. In the case of identification plates having an operating frequency in the UHF range (865-868 MHz) and the SHF range (2446-2454 MHz), it is possible to implement lambda-half dipole antennas, or at least dipole antennas which are mechanically truncated but electrically extended. This construction enables a range of several meters. This range also makes it possible to identify persons in a motor vehicle, thereby also indirectly enabling access control for the motor vehicle used by the identified person.

It has been demonstrated that the range between an identification plate and a reading device can be dependent on the type of motor vehicle. In addition, this occurrence has been traced back to, among other things, a layer of insulation in the windshield which insulates against both temperature and light, and which also simultaneously acts to dampen electromagnetic waves. Although every windshield which includes an insulation layer has a window which is transparent to electromagnetic waves, the fact that the reading range depends on the type of motor vehicle persists.

Instead of this state of affairs, it would be desirable for the reading range to be consistent across different vehicles. In order to enable a reliable reading of an identification plate located in the interior of a motor vehicle with a strong damping effect, the sensitivity of the reading device would have to be designed for and adjusted to a strong damping effect. In the case of vehicles with a very low damping effect, however, a very large range would result, and this can lead to interference. For example, where there are multiple road lanes with lifting gates, it may be possible that the reading device assigned to the selected road lane is not the only one activated, but rather additional neighboring reading devices are also activated. This would be undesirable. Accordingly, the reading range would need to be reduced for vehicles with a very low damping effect, by suitable means.

SUMMARY OF THE INVENTION

The invention addresses the problem by creating an identification plate having a reading range that can be adjusted to the damping effect exerted in the interior of a vehicle, thereby giving a consistent reading range. The identification plate has a chip module made of a chip, a coupling element connected to the chip, and an antenna module made of an antenna lead. The coupling element is coupled to the antenna lead by a coupling field that creates a contactless coupling. An adjustable damping element is arranged in the proximity of the coupling element. The damping element projects into the coupling field and dampens the coupling field. In this manner, a maximum value of a transmitting and receiving range of the identification plate can be reduced.

The invention is based on the following realizations. The ability to control the sensitivity of the reading device according to the type of motor vehicle would require clear recognition of the motor vehicle type. However, in practice, this would involve a very complex design. The manufacture of identification plates with varying ranges would increase the complexity of production and therefore raise the cost of the identification plate. In addition, in the event that the motor vehicle is exchanged, the identification plate of the person being identified would potentially need to be replaced with another chip having a different range. For this reason, the most efficient approach would be to have a unified design of identical chips, wherein the range thereof can be modified by means of simple, additional measures.

In the case of the present invention, it is assumed that all identification plates are built with a uniform design, and are constructed for maximum range by means of an optimal integration of a chip, a coupling element, and an antenna lead.

At the same time, the sensitivity of the reading device is adjusted in such a manner that the range is used which is required for a reliable identification of a person in the event that the identification plate is carried in a motor vehicle of a type which, among other motor vehicles which are common on the market and which have been tested, has the highest damping effect on electromagnetic waves. In order that the range is not increased unintentionally in the case of motor vehicles with lower damping effects, the identification plates are artificially dampened, and the range is thereby reduced to the desired distance. A damping element serves the purpose of damping by being mechanically introduced into the proximity of a coupling element between the chip and the antenna lead. The coupling is realized via a coupling field without contact. The damping element projects into this coupling field and dampens the coupling field without damping the electromagnetic field of the antenna lead. In this case, a different degree of damping can be achieved by means of a variable distance or a variable shielding.

The coupling field which produces the contactless coupling is a magnetic, inductively generated, or electrical, capacitively generated, or electromagnetic coupling field.

The coupling element and the antenna lead are preferably arranged on one support platform. The damping element is oriented parallel to this support platform as an electrically conductive surface, and at least partially shields the coupling element and/or the antenna lead in damping positions.

In this embodiment, the coupling element, the antenna lead, and the damping element are oriented in one plane as a unit. As such, the configuration ensures a reproducible amount of damping according to a certain distance between the damping element and the coupling element and/or the antenna lead, or according to a certain shielding of the coupling element and/or antenna lead by means of the damping element.

The damping element can be constructed to be displaceable relative to the support platform and parallel to the same. In this case, a displacement of the damping element occurs in the same dimension in which the profiles of the coupling element and the antenna lead rise. This enables a fine, linear modification of the damping according to the displacement of the damping element.

The damping element can be mounted on the support platform. In this way, the configuration necessarily leads to a mechanical coupling between the damping element on the one hand, and the coupling element and antenna lead situated on the support platform on the other hand. This configuration simplifies the adjustment of the degree of damping, as well as the physical manipulation of the identification plate.

The damping element can be mounted on a support holder. First, the use of a support holder in a motor vehicle is practical because the correct positioning of the identification plate with respect to the window in the windshield, wherein the window is transparent to electromagnetic waves, is ensured in this way. The arrangement of the damping element on the support holder has the effect that a pre-set damping automatically comes into effect when the identification plate is slid into place on the support platform, without the need to undertake any mechanical modifications to the identification plate itself or to the support platform of the same.

The damping element can be arranged on a supplementary card which can be slid into the support holder. This makes a different manner of adjusting the damping possible by selecting different supplementary cards for use in the support holder.

Position marks that correspond to the different degrees of damping can be arranged on the support platform, on the support holder, and/or on the supplementary card. These position marks, determined based on prior experiments, enable a targeted adjustment of the required degree of damping for the desired reading range of the identification plate by the user.

The damping element and/or the support holder can have at least one spring-loaded latch that snaps into place in one of the locking grooves of the support platform and/or the supplementary card. The locking grooves correspond to damping positions.

The configuration ensures, by means of the latch and the locking grooves, that the position of the damping element with respect to the support platform is maintained following manual positioning of the same, and is not altered by dislocation or shaking.

The identification plate can be designed as a sticker which only reaches its resonance frequency once it is adhered onto the windshield. In contrast to the variants described above, the identification plate remains in the motor vehicle following installation. Then, on the reverse side of the identification plate, facing the interior of the vehicle, the damping element is likewise attached by means of adhesion on a marking. By means of the adhered damping element, various damping levels can be set as described above by means of the position of the adhered damping element on the marking lines.

Numerous other objects and advantages of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
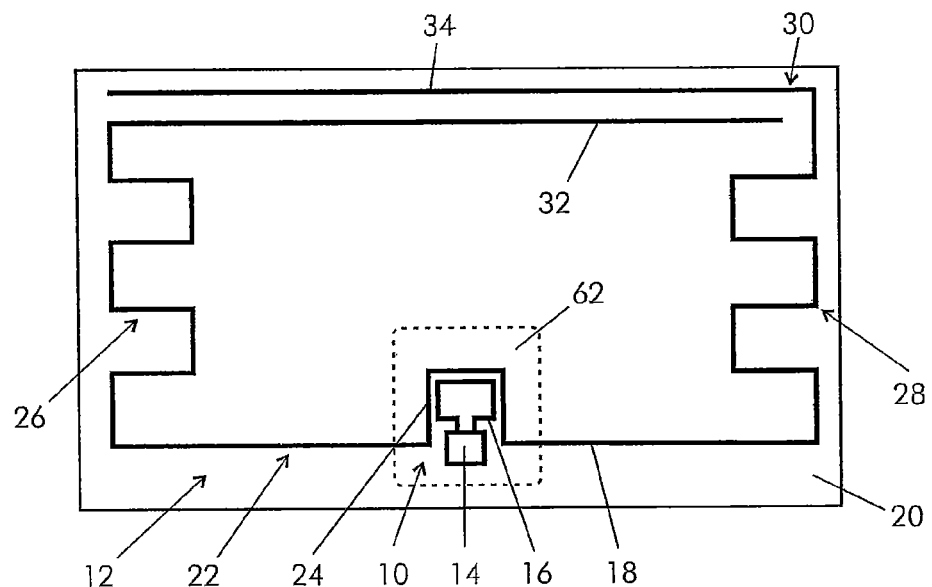
FIG. 1 shows an identification plate having an antenna and coupling element according to a first variation of the present invention.

The identification plates illustrated in FIGS. 1 to 4 have different antenna and coupling variants. The identification plate according to FIG. 1 shows a chip module 10 and an antenna module 12. The chip module 10 comprises a chip 14 and a coupling loop 16 connected to the chip 14. The antenna module 12 comprises an antenna lead 18 inductively coupled to the coupling loop 16. The chip module 10 made of the chip 14 and the coupling loop 16, as well as the antenna module 12 with the antenna lead 18, are situated on a support platform 20, wherein the latter is a plastic film in this case. The antenna lead 18 is an insulated wire attached mechanically to the support platform 20 by means of a laying technique using heat and pressure.

The antenna lead 18 is structured in the form of a loop having the shape of a rectangle. A loop 24 is constructed on an arm 22 of the antenna lead 18, wherein the arm is adjacent to the chip module 10, and the loop 24 produces a close coupling of the antenna loop to the coupling loop 16 of the chip module 10. Two arms 26, 28 of the antenna lead 18, the arms lying opposite each other and completing the arm 22 at right angles thereto, are designed with a curved shape. The curved shape produces an electrical extension of a mechanically truncated antenna. On an arm 30 of the antenna loop which lies opposite the arm 22 and the chip module 10, end regions 32, 34 of the antenna lead 18 are positioned parallel, overlapping, and at a small distance to each other, but are not electrically connected.

Figure 2:
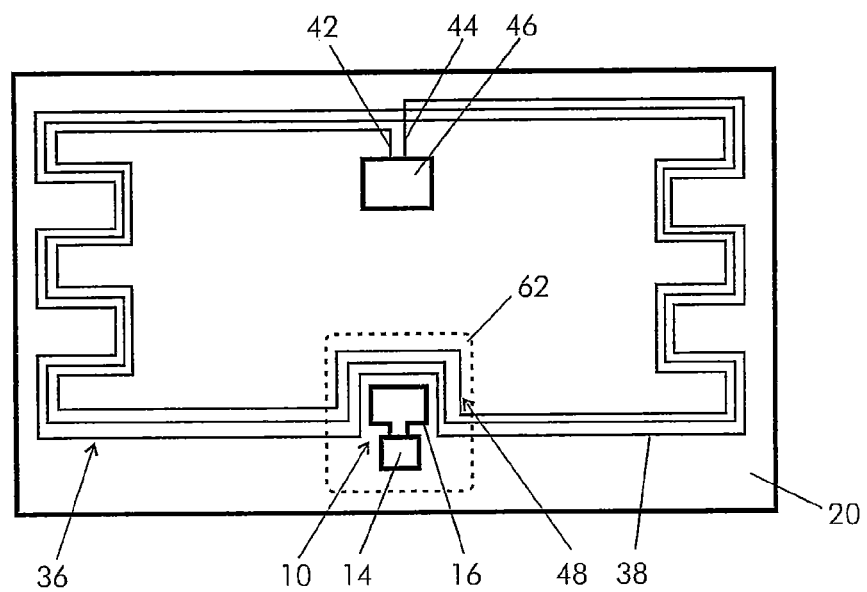
FIG. 2 shows an identification plate having an antenna and coupling element according to a second variation of the present invention.

The identification plate illustrated in FIG. 2 differs from that shown in FIG. 1 in the design of its antenna module 36. The antenna module 36 comprises an antenna lead 38 which is arranged and attached on a support platform 20 by means of a laying technique, wherein the support platform 20 comprises a plastic film. The antenna lead 38 has multiple windings, wherein the ends 42, 44 thereof are routed to a chip 46 for the HF range, and the ends 42, 44 are welded to the terminals of the chip 46.

The windings of the loop formed by the antenna lead 38 likewise have a rectangular structure. On the side which lies opposite the chip 46, regions of the windings are routed as a loop 48. Similarly to FIG. 1, the chip module 10 is positioned and attached to the support platform 20 in such a manner that the coupling loop 16 is enclosed by the loop 48. The multiple windings of the antenna lead 38 behave like a single-winding antenna for the chip module 10 in the UHF range due to the capacitive connection, similarly to the illustration in FIG. 1

Figure 3:
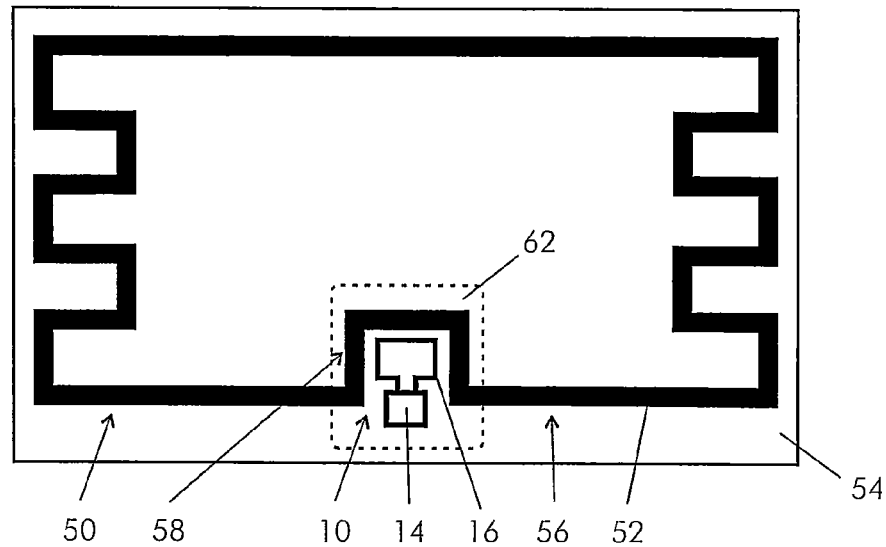
FIG. 3 shows an identification plate having an antenna and coupling element according to a third variation of the present invention.

In the illustration in FIG. 3, an antenna module 50 comprises a circuit path which functions as the antenna lead 52 and which is produced by means of an etching technique. The circuit path is produced on a support platform 54 comprised of a printed circuit board. The antenna lead 52 forms a closed antenna loop. A loop 58 is formed on an arm 56 of the antenna lead 52, wherein the arm is adjacent to the chip module 10. This loop 58 provides a close coupling of the antenna loop to the coupling loop 16 of the chip module 10. The coupling is realized inductively via a magnetic coupling field.

Figure 4:
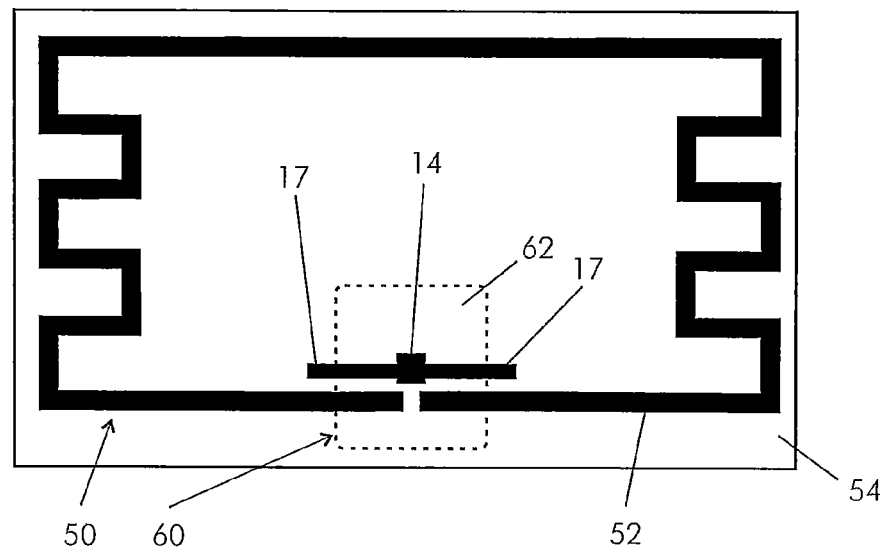
FIG. 4 shows an identification plate having an antenna and coupling element according to a fourth variation of the present invention.

The illustration in FIG. 4 differs from FIG. 3 in the manner of the coupling. The antenna lead 52 forms an open antenna loop. Instead of an inductive coupling, as in FIGS. 1 to 3, a capacitive coupling is included which works via an electrical coupling field. A coupling element 60 comprises two vanes 17 connected to the chip 14. These vanes 17 are situated opposite interrupted segments of an antenna lead 52 of an antenna module 50, and run parallel to the same.

All of the illustrations in FIGS. 1 to 4 have in common that a field 62 is present, the same being drawn with a dashed line and bounding the coupling element 60. This field 62 illustrates a region in which the damping of the coupling loop 16 and/or the coupling element 60 takes effect as a result of the insertion of a damping element.

Figure 5A:
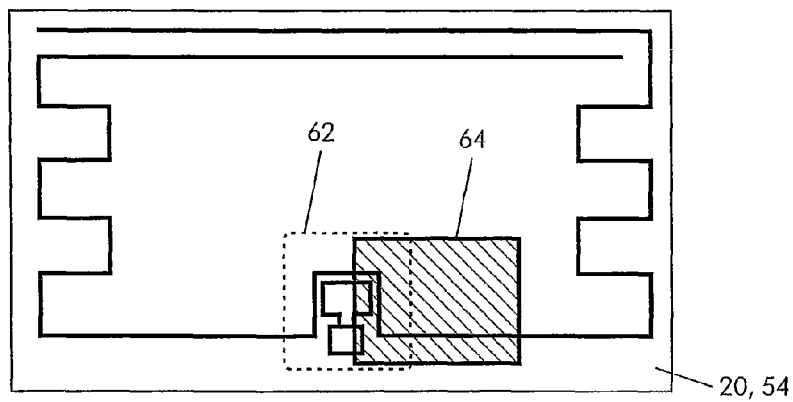
FIGS. 5a to 5c show identification plates having a damping element in different positions.
Figure 5B:
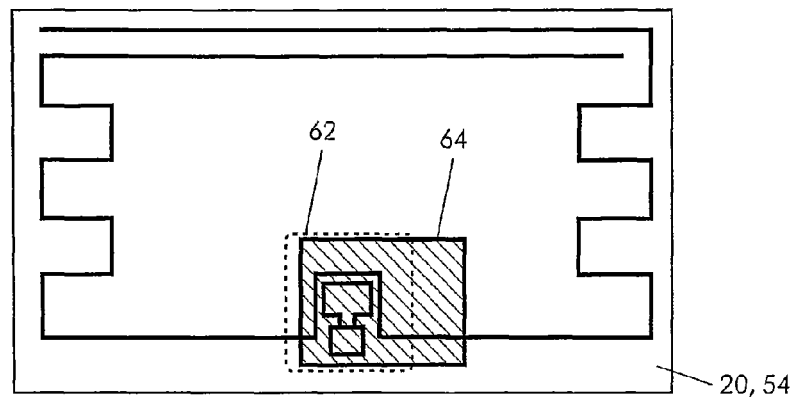
Figure 5C:
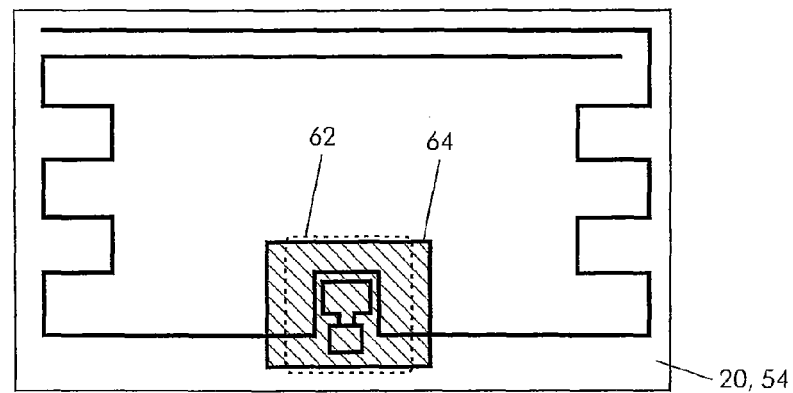

FIGS. 5a to 5c show an identification plate according to FIG. 1, having a damping element 64 in various positions above a field 62. The damping element 64 comprises an electrically conductive surface which is oriented parallel to the support platform 20, 54. The damping element 64 can be displaced relative to the field 62 and parallel to the support platform 20, 54. The adjustment between the chip 14 and the antenna lead 18, 38, 52 is altered by means of a different width of shielding of the field 62 with the coupling loop 16 and/or the coupling element 60, the former and the latter being situated in the field 62. This adjustment becomes worse as the shielding of the field 62 increases, leading to a damping of the identification plate and a reduction in the reading range.

Three different damping positions are illustrated in FIGS. 5a to 5c. FIG. 5a shows a minimal shielding and therefore a minimal damping. FIG. 5b shows a moderate shielding and therefore a moderate damping. FIG. 5c shows a strong shielding and therefore a strong damping. With no damping element 64, no damping effect exists. The damping element 64 in this case can be a sticker which can be adhered on the respective marked positions. This configuration is relevant for both an identification plate which can be removed from a guide or from a support holder, and also an identification plate in the form of a sticker which can be fixed to a windshield.

Figure 6:
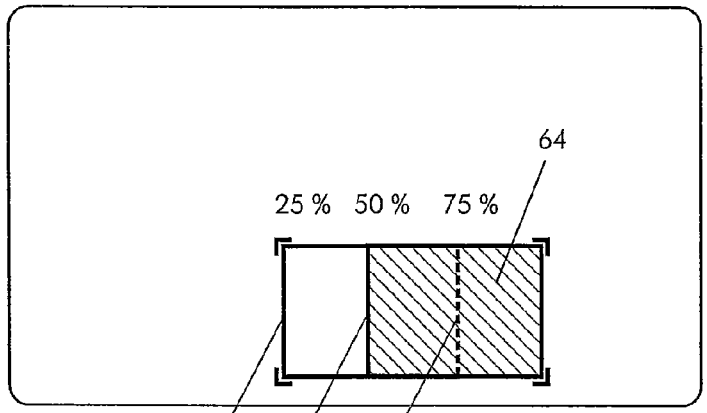
FIG. 6 shows a support platform of an identification plate having different position marks.

FIG. 6 shows a support platform of one of the previous embodiments of an identification plate, having different position marks 66, 68, 70. Numbers are displayed at the position marks 66, 68 70, and display the degree of reduction of the maximum reading range when the damping element 64 is positioned accordingly. In practice, the position marks are determined by undertaking reading range measurements at the levels associated with each of the marks, and determining the positions of the damping elements at each mark.

Figure 7:
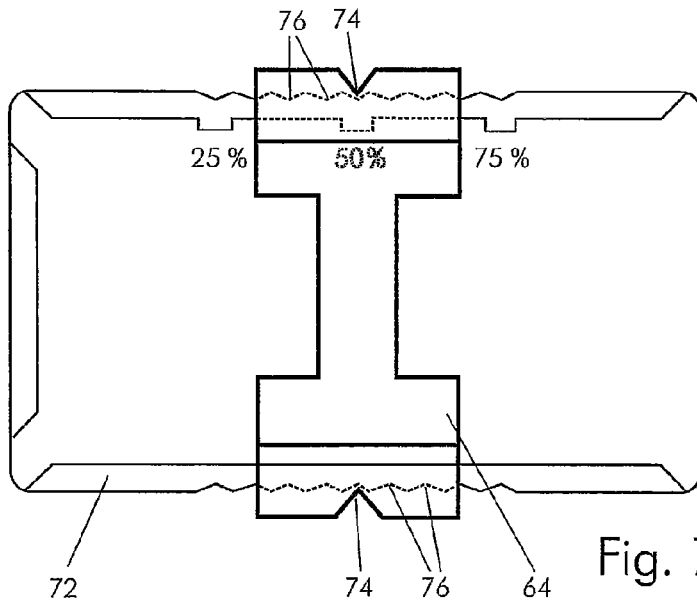
FIG. 7 shows a support holder having an adjustable damping element.

FIG. 7 shows a support holder 72 for a support platform 20, 54 with an identification plate, as is used in practice in a motor vehicle. A damping element 64 which can be moved is situated on the support holder 72. A spring-loaded latch 74 is arranged on the damping element 64 and can snap into place in one of the locking grooves 76 in the support holder 72 according to the position thereof relative to the support holder 72. When a support platform 20, 54 with an identification plate is inserted into a support holder 72, the coupling loop 16 and/or the coupling element 60 is then automatically shielded to the degree necessary, thereby achieving the desired damping. The identification plate has its full range when outside of the support holder 72.

Figure 8:
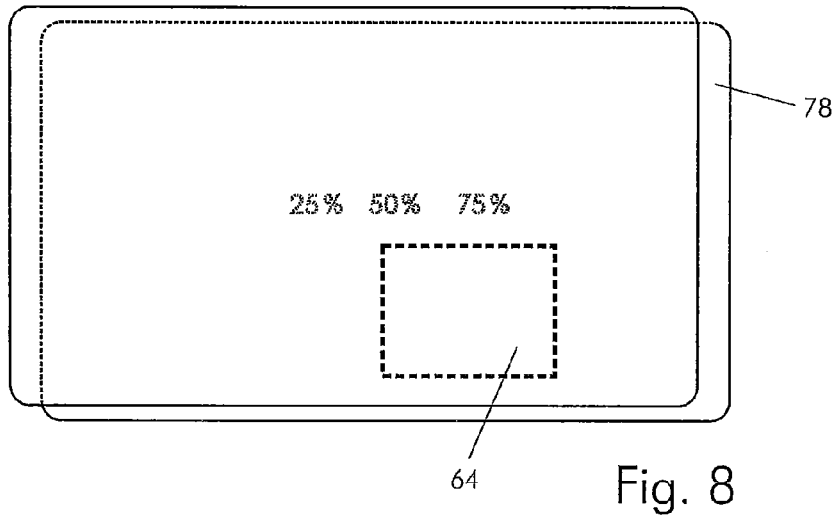
FIG. 8 shows a supplementary card having a damping element.

FIG. 8 shows a supplementary card 78 with a damping element 64. This supplementary card 78 is inserted into a support holder 72 together with a support platform 20, 54 having an identification plate. A region of the coupling loop 16 and/or the coupling element 60 is then likewise shielded, and the desired damping thereby realized. Three supplementary cards 78 are available, wherein the damping element 64 is arranged at different positions therein. Corresponding number indications show the degree of reduction in range at a prespecified position of the damping element 64.

While the invention has been specifically described in connection with specific embodiments thereof, it is to be understood that this is by way of illustration and not of limitation, and the scope of the appended claims should be construed as broadly as the prior art will permit.

What is claimed is:

1. An identification plate, comprising:
   a chip module comprising a chip and a coupling element connected to the chip;
   an antenna module comprising an antenna lead, the coupling element being coupled in a contactless manner to the antenna lead by a coupling field; and
   an adjustable damping element arranged in a proximity of the coupling element and projecting into the coupling field to damp the coupling field, whereby a maximum value of a transmitting and receiving range of the identification plate can be reduced;
   wherein the damping element is arranged to dampen the coupling field that couples the coupling element and the antenna lead, without damping an electromagnetic field of the antenna lead.

2. The identification plate according to claim 1, wherein the coupling field that produces the contactless coupling is a magnetic, inductively generated coupling field.

3. The identification plate according to claim 1, wherein the coupling field that produces the contactless coupling is an electric, capacitively generated coupling field.

4. The identification plate according to claim 1, wherein the coupling field that produces the contactless coupling is an electromagnetic coupling field.

5. The identification plate according to claim 1, wherein the coupling element and the antenna lead are arranged on a support platform, and the damping element is oriented parallel to the support platform as an electrically conductive surface, at least partially shielding the coupling element.

6. The identification plate according to claim 5, wherein the damping element is moveable parallel to and relative to the support platform.

7. The identification plate according to claim 5, wherein the damping element is mounted on the support platform.

8. The identification plate according to claim 5, wherein the identification plate is arranged in a support holder.

9. The identification plate according to claim 8, wherein the damping element is mounted on the support holder.

10. The identification plate according to claim 9, further comprising a spring-loaded latch that snaps into a locking groove to hold the damping element in a selected damping position relative to the support holder.

11. The identification plate according to claim 8, wherein the damping element is arranged on a supplementary card which can be slid into the support holder.

12. The identification plate according to claim 1, wherein the identification plate is permanently fixed to a windshield.

13. The identification plate according to claim 1, wherein the damping element is removable.

14. The identification plate according to claim 1, wherein the damping element is permanently fixed.

15. An identification plate, comprising:
a chip module comprising a chip and a coupling element connected to the chip;
an antenna module comprising an antenna lead, the coupling element being coupled in a contactless manner to the antenna lead by a coupling field; and
an adjustable damping element arranged in a proximity of the coupling element and projecting into the coupling field to damp the coupling field, whereby a maximum value of a transmitting and receiving range of the identification plate can be reduced;
wherein the coupling element and the antenna lead are arranged on a support platform, and the damping element is oriented parallel to the support platform as an electrically conductive surface, at least partially shielding the coupling element;
wherein the damping element is mounted on the support platform; and
wherein position marks are arranged on the support platform, and said position marks correspond to different degrees of damping.

16. The identification plate according to claim 15, wherein the damping element is adhered onto one of the position marks.

17. An identification plate, comprising:
a chip module comprising a chip and a coupling element connected to the chip;
an antenna module comprising an antenna lead, the coupling element being coupled in a contactless manner to the antenna lead by a coupling field; and
an adjustable damping element arranged in a proximity of the coupling element and projecting into the coupling field to damp the coupling field, whereby a maximum value of a transmitting and receiving range of the identification plate can be reduced;
wherein the coupling element and the antenna lead are arranged on a support platform, and the damping element is oriented parallel to the support platform as an electrically conductive surface, at least partially shielding the coupling element;
wherein the identification plate is arranged in a support holder;
wherein the damping element is mounted on the support holder; and
wherein position marks are arranged on the support holder, and said position marks correspond to different degrees of damping.

18. An identification plate, comprising:
a chip module comprising a chip and a coupling element connected to the chip;
an antenna module comprising an antenna lead, the coupling element being coupled in a contactless manner to the antenna lead by a coupling field; and
an adjustable damping element arranged in a proximity of the coupling element and projecting into the coupling field to damp the coupling field, whereby a maximum value of a transmitting and receiving range of the identification plate can be reduced;
wherein the coupling element and the antenna lead are arranged on a support platform, and the damping element is oriented parallel to the support platform as an electrically conductive surface, at least partially shielding the coupling element;
wherein the identification plate is arranged in a support holder;
wherein the damping element is arranged on a supplementary card which can be slid into the support holder; and
wherein position marks are arranged on the supplementary card, and said position marks correspond to different degrees of damping.

* * * * *